United States Patent [19]
Bulgarelli et al.

[11] Patent Number: 5,231,338
[45] Date of Patent: Jul. 27, 1993

[54] CONTROLLING A MULTIPHASE BRUSHLESS MOTOR WITHOUT POSITION SENSORS FOR THE ROTOR, USING A SYSTEM OF DIGITAL FILTERING

[75] Inventors: Olivo Bulgarelli, Carpi; Edgardo Balboni, Alberone di Cento; Giulia Gianoli, Sondrio, all of Italy

[73] Assignee: SGS-Thomson Microelectronics S.R.L., a Corp. of Italy, Agrate Brianza, Italy

[21] Appl. No.: 613,290

[22] Filed: Nov. 15, 1990

[30] Foreign Application Priority Data

Nov. 17, 1989 [IT] Italy ............................ 83647 A/89

[51] Int. Cl.$^5$ ........................................... H02P 6/02
[52] U.S. Cl. ............................ 318/254; 318/138; 318/439
[58] Field of Search ................... 318/254, 138, 439

[56] References Cited

U.S. PATENT DOCUMENTS

| | | | |
|---|---|---|---|
| 4,169,990 | 10/1979 | Lerdman | 318/254 X |
| 4,641,066 | 2/1987 | Nagata et al. | 318/254 |
| 4,752,724 | 6/1988 | Radziwill et al. | 318/254 |
| 4,922,169 | 4/1990 | Freeman | 318/254 |

*Primary Examiner*—William M. Shoop, Jr.
*Assistant Examiner*—David Martin

[57] ABSTRACT

A control circuit is used for driving a multiphase brushless DC motor. The back emf of a non-excited winding is sensed, and a control signal is generated when a sinusoidal signal on the winding crosses a reference voltage level. Commutation occurs when the control signal is generated. Masking circuitry inhibits sensing of back emf immediately after commutation for a time period which is sufficient to ensure that noise from commutation spikes has ceased.

9 Claims, 6 Drawing Sheets

CONTROLLING A MULTIPHASE BRUSHLESS MOTOR WITHOUT POSITION SENSORS FOR THE ROTOR, USING A SYSTEM OF DIGITAL FILTERING

BACKGROUND OF THE INVENTION

1. Field of the invention

The present invention relates to control and regulating circuitry for electronically commutated direct current motors (commonly known by the term "brushless"). Such regulating and control circuitry is often integrated monolithically in semi-conductor devices.

2. Description of the prior art

Brushless DC motors are well known and their use is increasingly widespread because of their characteristics of low electrical noise. Although a direct current motor, the brushless motor behaves like an alternating current synchronous motor inasmuch as it is equipped with "position sensors" which are used in order to commutate the current electronically through the phase windings. The rotor is a permanent magnet which is made to rotate by the rotating magnetic field obtained by commutating the excitations of the windings of the stator. The position of the permanent magnet rotor determines the commutation and can be detected by means of suitable sensors such as light emitters and photo-detectors, Hall effect devices etc. These position sensors are, however, relatively expensive devices which introduce further reliability problems into the systems.

By virtue of the presence of electromotive forces induced by the rotation of the permanent magnet on the stator phase windings of the motor, it is in theory possible to reconstruct such back emf signals and to use them in order to determine the position of the rotor, or to use such electromotive force signals suitably reconstructed in order to synchronize the commutation.

For example, in the case of a three-phase motor, taking into account that the emfs induced in the three phases of the stator oppose the respective voltages applied, the equivalent circuit in star-configuration is represented schematically in FIG. 1. The three signals V(AO), V(BO) and V(CO) can be obtained using three differential amplifiers. One input terminal of each differential amplifier is connected to the star-centre voltage V(O), and the other input terminal of the three amplifiers are connected to the voltages V(A), V(B) and V(C), respectively. When the three signals are observed on the oscilloscope, they have the appearance illustrated in FIG. 2.

As can be observed, when the commutation from one phase to another takes place, high frequency disturbances occur in the form of voltage peaks (spikes), but in spite of this the trend of the three signals can be considered approximately sinusoidal. In particular, the sine wave appears clearly defined and essentially free of disturbances in the section of crossing of the axis of the abscissas. These signals also contain a term constituted by the emf induced by the movement of the rotor and, if deprived of the disturbances caused by the commutations, could effectively be used in order to determine, through their analysis, the position of the rotor without the aid of any specific sensor. On the other hand, the use of analog techniques such as, for example, a variable-frequency low-pass filter, in order to filter the disturbances caused by the commutation of the motor poses problems of integration of the necessary passive and response components, especially at low speeds of rotation of the motor. Another problem is constituted by the fact that the signals also contain terms linked to the values of resistance and inductance (R and L) of the windings. This implies a specific design of the control circuit which takes account of the values of R and L of the motor. Another known solution, according to which the information supplied by a VCO (Voltage-Controlled Oscillator) is used in order to control the commutation of the phases of the motor, also has problems in terms of insufficient rapidity of the control system in adapting itself to sudden variations of speed of rotation of the motor which can take place. A forced temporary mechanical locking of the rotation, for example, can cause the loss of the position.

OBJECTIVE AND SUMMARY OF THE INVENTION

The principal aim of the present invention is that of providing a control system which leaves out of consideration the resistance and inductance of the phase windings of the stator of the motor, which has response characteristics which are essentially independent of the speed of rotation of the motor, and which is easily integratable.

With reference to winding A in the diagrams in FIGS. 1 and 3 and observing the torque curves A and $C\bar{B}$ in FIG. 4, it can be noted that the emf E(A) induced in winding A, which opposes the torque produced in A by the motor, is displaced in phase by 90° in relation to the curve $C\bar{B}$. Consistently with this, if the $C\bar{B}$ phases are excited when the rotor moves from position III to position IV, that is to say in the section of maximum torque, the trend indicated in the diagram in FIG. 4 by means of a thick line, that is to say the passage of the voltage through the reference level, will be observed experimentally for E(A). When the rotor is in positions other than III, other portions of the curve E(A) will of course be observed. The observation of the emf in the three phase windings of the motor is therefore capable of providing information on the position of the rotor and can thus be used in place of position sensors.

The signals available are those at the ends of the windings V(A), V(B), V(C) and the star-centre potential V(O). Assuming that the resistances and the inductances of the three phases of the motor are identical with one another, and by exciting, for example, the phases $C\bar{B}$, the electric circuit in FIG. 3 is obtained, in which Rs is a sensing resistor. Comparing the signals at the ends of the windings with the star-centre, analysis of the circuit in FIG. 3 gives the following equations:

$$V(AO) = V(A) - V(O) = +E(A)$$

$$V(BO) = V(B) - V(O) = -R \cdot i - L \cdot di/dt - E(B)$$

$$V(CO) = V(C) - V(O) = R \cdot i + L \cdot di/dt + E(C)$$

By choosing to observe the signal V(AO) when the phases $C\bar{B}$ are excited, information on E(A) is obtained, which is advantageously free of terms dependent upon R and L.

By cyclically selecting in this manner the three phases of the motor and analyzing the signal of potential difference in relation to the star-centre, the same information is obtained exclusively on the terms of emf of these signals. In other words, the relevant signals represent the value of emf without terms dependent upon the value of R and L of the winding. The following table I is obtained from these considerations:

TABLE I

| EXCITED PHASE | OBSERVABLE EMF |
|---|---|
| $C\overline{B}$ | $V(AO) = + E(A)$ |
| $\overline{B}A$ | $V(CO) = + E(C)$ |
| $A\overline{C}$ | $V(BO) = + E(B)$ |
| $\overline{C}B$ | $V(AO) = + E(A)$ |
| $B\overline{A}$ | $V(CO) = + E(C)$ |
| $\overline{A}C$ | $V(BO) = + E(B)$ |

Essentially, the control system according to the invention makes use of logic means in order to select the signal relating to the non-excited phase winding of the motor, determining its passage through a reference voltage level of the sinusoidal signal selected by means of a comparator with hysteresis a logic commutation signal is generated and applied to a "state machine" (phase translator circuit) which commutates the excitation of the respective phase windings of the motor at the correct moment. The system makes use of digital filtering of the disturbances ("spikes") caused by the commutation of the motor. This is achieved by masking the signals relating to the various phase windings of the motor so as to prevent their selection for a time which is sufficiently long to allow the decay of the transitory voltage peaks caused by the last commutation which has taken place. The selection and the analysis of the selected signal is enabled after the masking period in order to determine the successive commutation at the correct moment.

BRIEF DESCRIPTION OF THE DRAWINGS

The various aspects and advantages of the invention will be more easily understood by means of the following description of a practical embodiment which relates to a three-phase motor and makes reference to the attached drawings, in which.

DESCRIPTION OF THE PREFERRED EMBODIMENT

Figure 5:
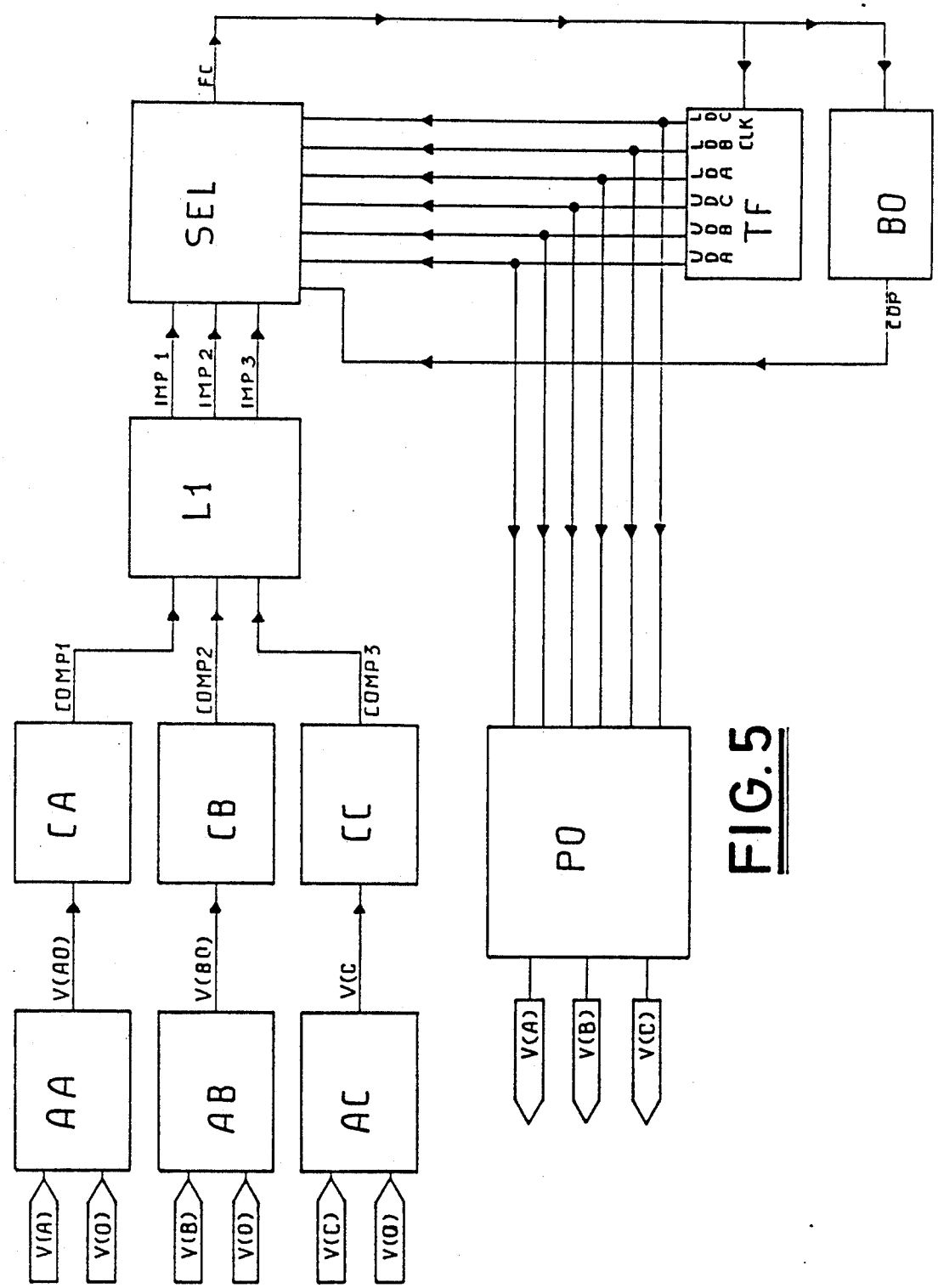
FIG. 5 is a complete block diagram of the control circuit made according to the present invention.

The block diagram of the control system of the invention is shown in FIG. 5.

The signals V(AO), V(BO) and V(CO) are obtained by using three associated differential input stages AA, AB and AC, to the input points of which are applied the indicated voltages, already mentioned previously.

Since it is desired to provide the system with a single supply (0,+12V) while the signals assume values both positive and negative (sinusoidal trend), it is necessary to impose an intermediate reference voltage which is common to all three stages, for example +5V, according to common practice.

The three signals V(AO), V(BO) and V(CO) are applied respectively to an input terminal of the same number of comparators CA, CB and CC. Each of the comparators is constituted essentially by a circuit which compares the respective signal with the reference voltage (for example, +5V as indicated above). Preferably, common comparators with hysteresis are used. The signals produced by the comparators are applied to a logic circuit for pulse generation L1 which generates at the same number of outputs logic level ("φ" or "1") pulses which are representative of the state of the comparators.

These logic signals, indicated in FIG. 5 by IMP1, IMP2 and IMP3 respectively, are applied to the same number of inputs of a logic block for selection SEL which selects the input relating to the non-excited winding, according to what has been discussed previously. The logic block SEL identifies the moment at which the signal (V(AO), V(BO) or V(CO)) relating to the input selected passes through the reference voltage value, and generates as output a commutation pulse FC. The logic circuit for selection SEL selects the logic signal relating to the non-excited phase of the motor according to table I by recognizing the associated configuration of the outputs of the phase translator circuit TF. The phase translator circuit TR controls the power stage PO, which in turn commutates the supply through the stator phase windings of the motor. Upon each generation of a commutation pulse FC, the phase translator circuit TF determines a commutation of the excitation of the motor.

The digital filtering of the disturbances (spikes) caused by the commutation is implemented by means of the block BO which, upon each commutation pulse FC, generates a masking signal COP of predetermined duratron. The masking signal COP is applied to the logic circuit L1 for selection in order to inhibit the selection and the successive analysis of the voltage signal. The inhibit state is maintained for a time sufficient for the selected decay of the disturbances caused by the preceding commutation of the motor. The duration of the masking signal COP generated by the circuit BO is not preset but varies as a function of the speed of rotation of the motor. Preferably, the circuit BO generates a masking signal COP which has a duration equivalent to a preset fraction of the time which intervenes between two successive commutations of the motor.

Pulse generation logic (L1)

The system is of sequential type and therefore the output signals of the comparator have to be synchronized to the system clock by using flip-flops of the D type. In order to generate a pulse with each commutation edge (rise and fall) of the comparator, it is therefore sufficient to use an exclusive-OR gate.

Figure 6:
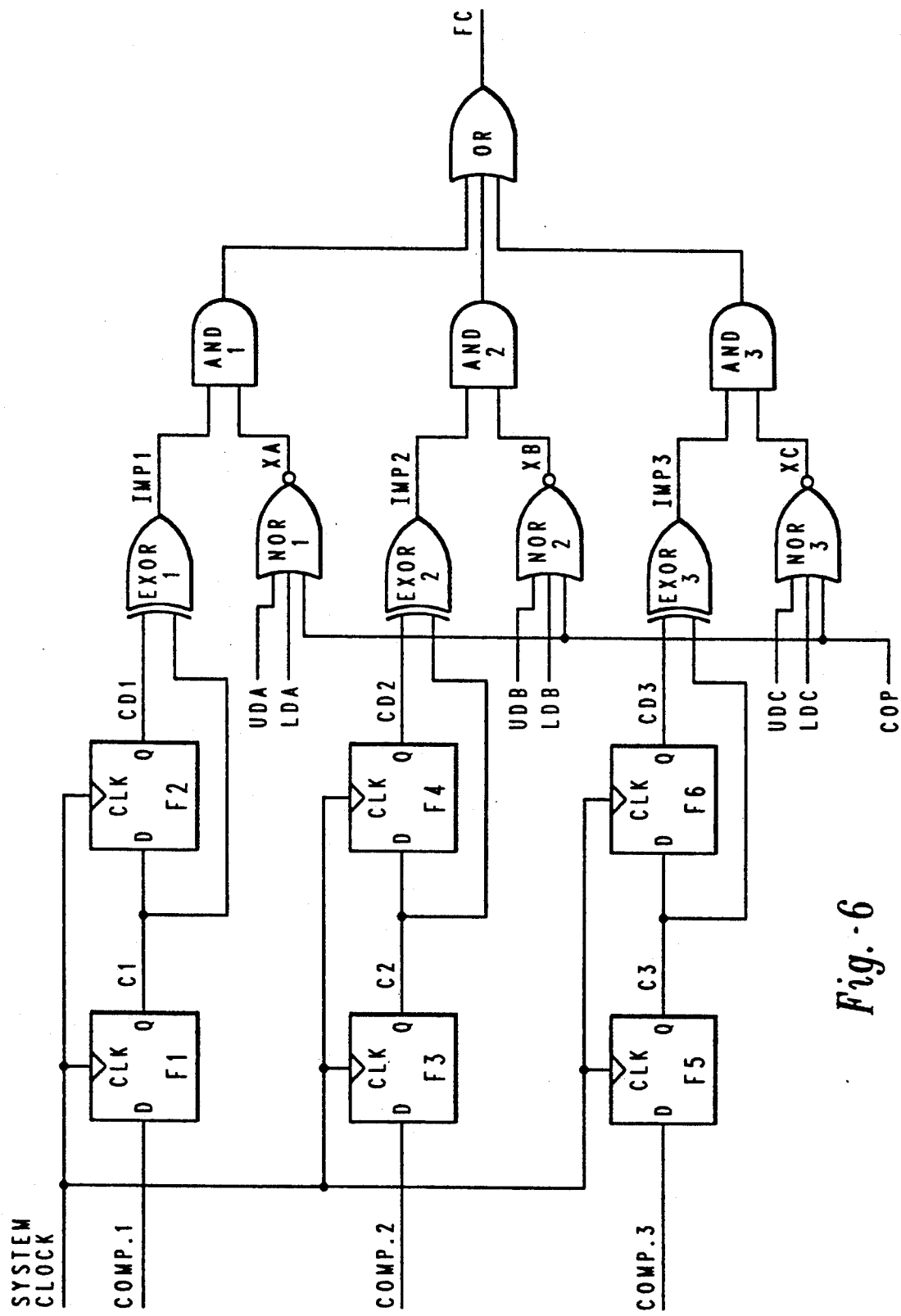
FIG. 6 is a basic functional diagram of the blocks L1 and SEL of the block diagram in FIG. 5.

With reference to FIG. 6, the block L1 is essentially constituted by the three identical circuits constituted by the two flip-flops of D type, F1–F2, F3–F4 and F5–F6 respectively, and by the exclusive-OR gate, exOR1, exOR2 and exOR3 respectively.

Selection logic (SEL)

Figure 4:
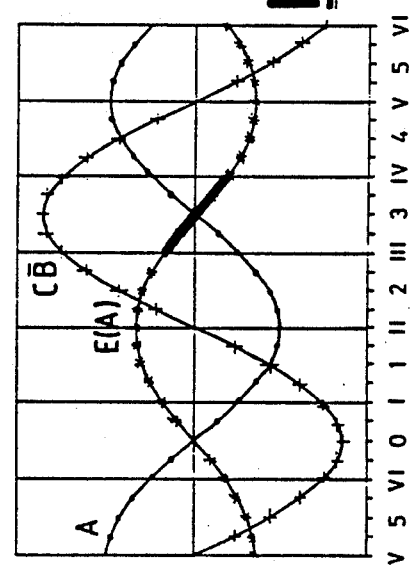
FIG. 4 shows, with reference to the winding A, the torque curves A and $C\overline{B}$ as well as the curve relating to the emf E(A) induced in the winding A, which opposes the torque produced in A by the motor.

The selection logic block SEL serves to choose, according to the excited phases, one of the three signals IMP1, IMP2 and IMP3 and to exclude all three of them during the masking time. This acts to select the input relating to the non-excited phase signal only at the moment close to the passage of the signal through the reference level (thick line section indicated in FIG. 4, related to the excitation of the phases $C\overline{B}$).

The signal to be selected is given by the following table II, in which, for each excited phase, the respective configuration of the outputs UDA, UDB, UDC, LDA, LDB and LDC of the phase translator circuit TF is indicated.

TABLE II

| Excited phase | UDA | UDB | UDC | LDA | LDB | LDC | Signal to be selected |
|---|---|---|---|---|---|---|---|
| A$\overline{C}$ | 1 | 0 | 0 | 0 | 0 | 1 | IMP2 |
| $\overline{C}$B | 0 | 1 | 0 | 0 | 0 | 1 | IMP1 |
| B$\overline{A}$ | 0 | 1 | 0 | 1 | 0 | 0 | IMP3 |
| $\overline{A}$C | 0 | 0 | 1 | 1 | 0 | 0 | IMP2 |
| C$\overline{B}$ | 0 | 0 | 1 | 0 | 1 | 0 | IMP1 |
| $\overline{B}$A | 1 | 0 | 0 | 0 | 1 | 0 | IMP3 |

The circuit for selection and generation of the commutation pulse FC is formed by the gates NOR1, NOR2 and NOR3, by the gates AND1, AND2 and AND3 and by the OR output gate.

Phase translator (TF)

Figure 7:
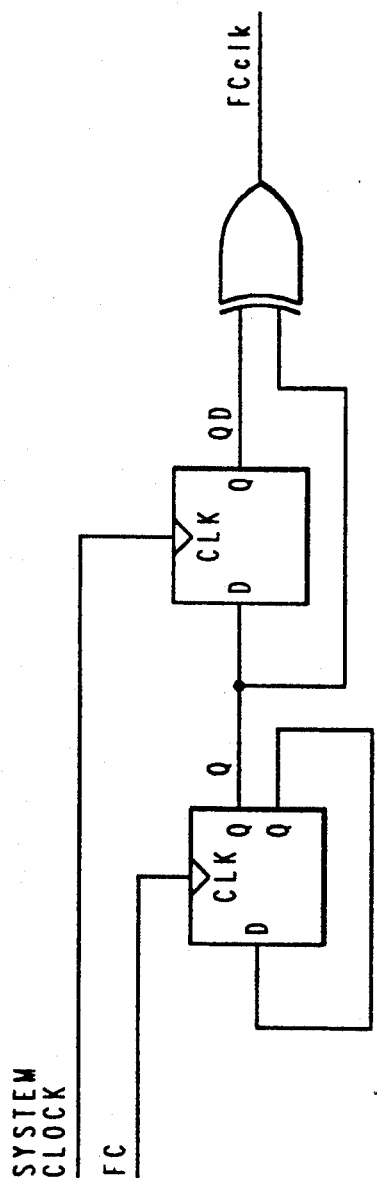
FIG. 7 is a basic functional diagram of the circuit used in order to convert the commutation pulse FC into a pulse of identical duration to the period of the system clock.
Figure 8:
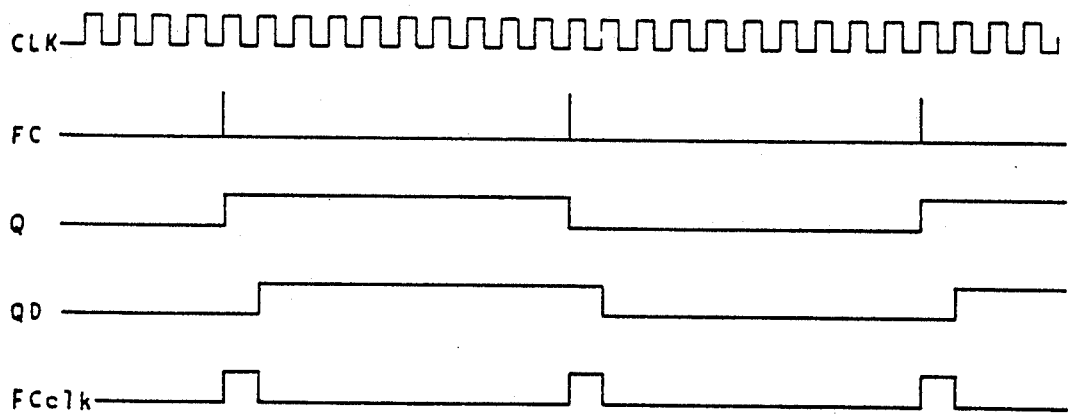
FIG. 8 represents the waveforms of the signals indicated in the preceding FIG. 7.

The phase translator block TF must provide a correct sequence of drive signals for the power transistors of the output block PO. The circuit TF is essentially a sequential pulse device synchronized with the system clock, in which, however, the change of state takes place only when a pulse FC arrives. This pulse must have the duration of a period of the system clock. In order to convert the pulse FC produced by the block SEL into a pulse FCclk of a duration equal to a period of the system clock, as required by the state machine, the circuit in FIG. 7 can be used, observing the relevant diagram of the signals shown in FIG. 8.

Figure 3:
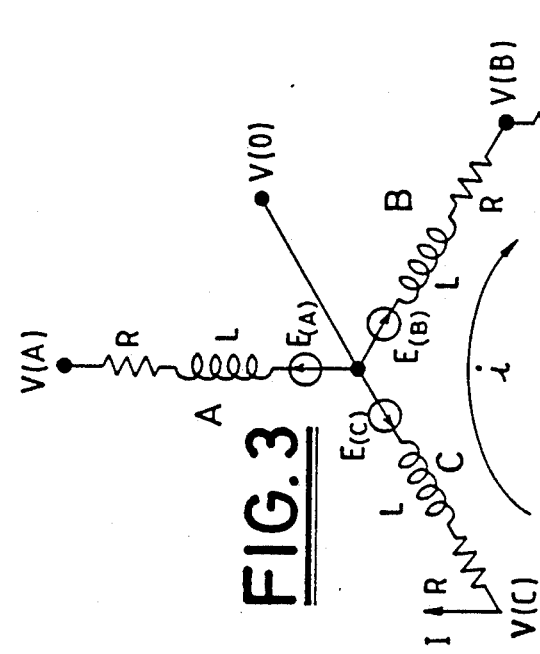
FIG. 3 represents the wiring diagram of the stator windings of the three-phase motor, already shown in FIG. 1, when the phases $C\overline{B}$ are excited, with the illustration also of an associated sensing resistor Rs which is commonly used by the current control loop.
Figure 2:
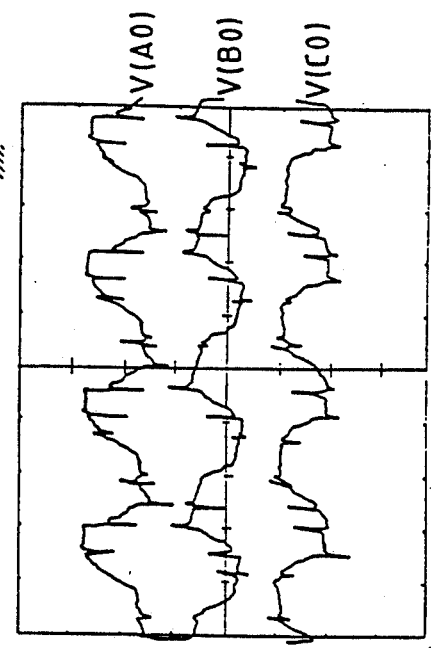
FIG. 2 shows the traces which can be observed on an oscilloscope of the three signals indicated in FIG. 1.
Figure 1:
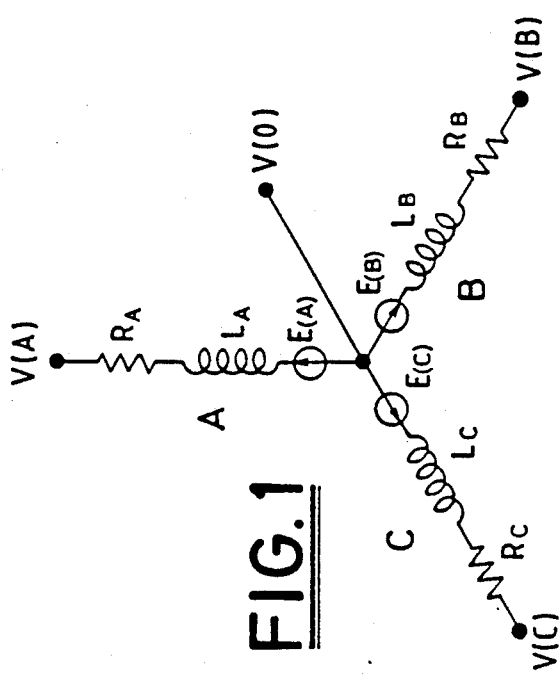
FIG. 1 is a wiring diagram of the stator windings of a three-phase motor in star-configuration.
Figure 9:
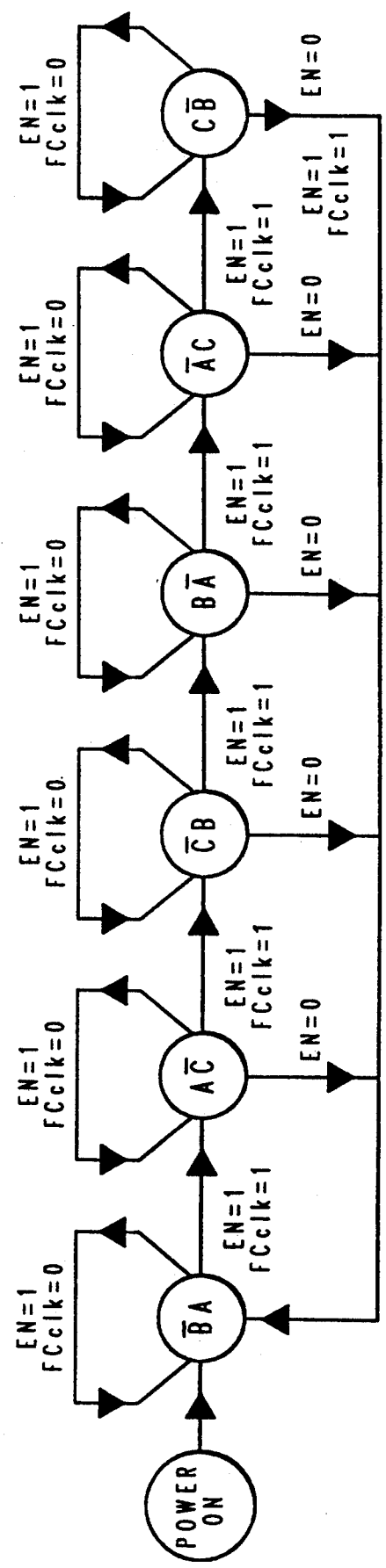
FIG. 9 represents a functional diagram of the state machine of the block TF of the block diagram in FIG. 5.

The state machine is preferably also provided with an enable input (EN) (not shown in FIG. 5) by means of which it can be locked in a defined state. Choosing the state of excitation $\overline{B}A$, the diagram of the states of the machine are shown schematically in FIG. 9, in order to make the three-phase motor represented schematically in FIGS. 1 and 3 rotate in a counter-clockwise direction.

There are six states in total and therefore the machine can be designed using a three bit counter (eight states, of which two must never appear) and a decoder, according to practice which is well-known to the expert and does not require further description.

Variable time masking circuit (BO)

The spikes caused by the phase commutation decay within a time which is shorter than, approximately, Tc/4, where Tc is the time which intervenes between two successive commutations. The masking signal COP generated by the block BO of the block diagram in FIG. 5 must therefore have a period equal to Tc and a duty-cycle of at least 25%. If assumed active high (+5V), the signal COP triggers high when the pulse FC, which is due to the passage through the reference level of the relevant signal of the phase selected, arrives. The signal COP prevents, for a certain time (masking time), any other possible spurious pulse (for example, due to a spike) from being transferred to the clock input CLK of the phase translator block TF in FIG. 5.

In order to achieve this, a frequency multiplier circuit PLL can be used. However, in addition to the difficulty of integration of the entire system on a single chip, this can give rise to problems associated with the limit frequency of the circuit PLL below which functioning can become erratic, causing problems in starting and in rotation at very low motor speeds.

The preferred solution is that of using a sequential network, exploiting the fact that the speed of the motor varies in a relatively slow manner. This means that the times which intervene between two pairs of commutations immediately following one another can in a first approximation be considered identical for all practical purposes.

Figure 10:
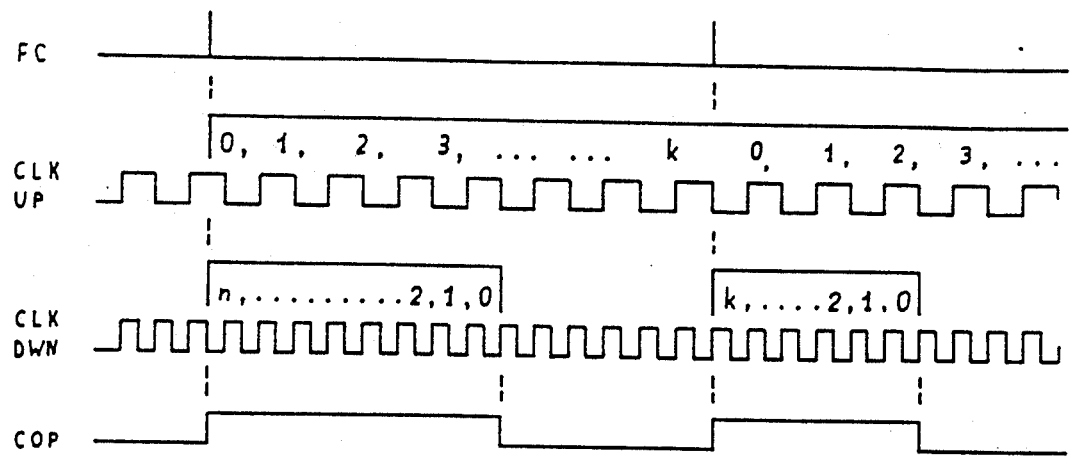
FIG. 10 illustrates the functioning of the block BO of the diagram in FIG. 5.

Essentially, use is made of two counters: one (CNTUP) counts from zero to n, where n is set as a function of the limits of the frequency of commutation and of the clock used, with a clock of period Tclk1. The other (CNTDWN), provided with presettable inputs, counts from the preset value (n at the maximum) to zero, with a clock of period Tclk2. The first counter evaluates, in terms of k clock periods, the time Tc between two commutations with an error equal to Tclk1. As soon as the second commutation takes place, the second counter is enabled to count from k and provides as output a high signal (COP) until it arrives at zero. The signal COP thus produced is the desired masking signal, the duration of which in relation to Tc depends on the clocks used by the two counters. The relevant functioning diagrams are shown in FIG. 10. When the first pulse FC arrives, the counter CNTDWN is preset to the maximum value n and starts the count-down, the counter CNTUP is set to zero and starts to count normally; upon the arrival of the second pulse FC, however, the value k, which has been reached by the counter CNTUP, is preset.

Choosing Tclk2=Tclk1/x (with $1<x<4$), the result is that the signal COP remains high exactly for a time equal to Tc/x±Tclk2.

It is now necessary to define the number of bits and the clock frequency of the counters. These depend on the maximum frequency of FC and on the minimum frequency at which it is desired to obtain correct masking and below which the system must always use the maximum value of the duration of masking time, or of n·Tclk2.

The value of minimum frequency is to be determined by taking various factors into account:

in order to have good starting of the motor, it is necessary to guarantee a masking time which is sufficiently long at very low speeds;

the wider the frequency range, the greater the number of bits of the counters has to be;

upon starting, in the acceleration phase, a relatively low inertia of the motor causes sufficiently high speeds (FC≃500 Hz) to be reached in a short time and therefore it can no longer be considered that the times Tc which intervene between two pairs of successive commutations are approximately equal. Therefore, if the time between two passages through the reference of the emf is shorter than 1/x of the time between the two preceding passages, it can happen that, in addition to the spikes, one passage through the reference level of the emf signal is also masked. This causes the absence of one commutation pulse and an incorrect excitation of the phases, which prevents the motor from accelerating. Therefore, the shorter the masking time (that is to say the greater x is), the smaller will be the probability that this happens.

By establishing that, at the maximum speed of rotation of the motor, Tc is equal to approximately 400 microseconds and deciding to accept an error of 10%, Tclk1 must be approximately 40 microseconds. This corresponds to a frequency of clock 1 Fclk1≃25 kHz.

Using a system clock of 500 kHz, it is possible to choose Fclk1=500 kHz/16=31.25 kHz, so that Tclk1=32 microseconds. Alternatively, FClK1 500 kHz/32=15.625 kHz, so that Tclk1=64 microseconds. In practice, it will be sufficient to use a 5 bit counter. In the following table III, the minimum frequency values are indicated, at which correct masking is maintained, as a function of the number of bits N of the counters and of the value of Tclk1.

TABLE III

| | $F_{min} = [Tclk1 \cdot 2^N]^{-1}$ | |
|---|---|---|
| N | Tclk1 = 64 μsec | Tclk1 = 32 μsec |
| 3 | 1953 Hz | 3906 Hz |
| 4 | 976 Hz | 1953 Hz |
| 5 | 488 Hz | 976 Hz |
| 6 | 244 Hz | 488 Hz |
| 7 | 122 Hz | 244 Hz |
| 8 | 61 Hz | 122 Hz |

Figure 11:
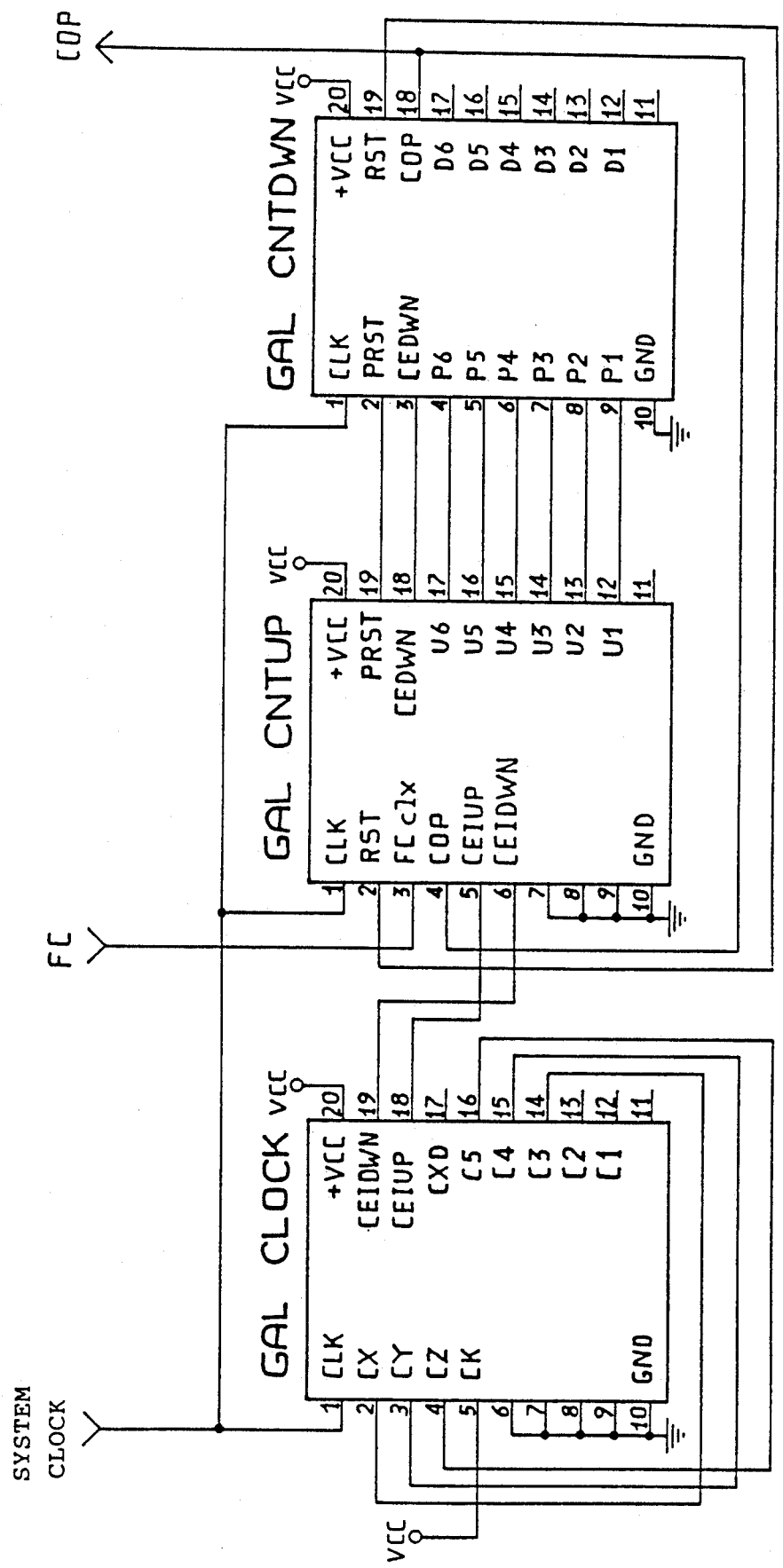
FIG. 11 represents an exemplary embodiment of the logic circuit of the block BO in FIG. 5.

In FIG. 11, a practical exemplary embodiment of the circuit of the block BO is shown, using a 5 bit counter GAL CLOCK in order to divide the frequency of the system clock and two 6 bit counters, GAL CNTUP and GAL CNTDWN respectively. All three counters are implemented in GAL (General Array Logic).

We claim:

1. A system for controlling in a commutated manner a multiphase brushless DC motor having a permanent-magnet rotor and a stator with at least two primary windings forming a multiphase system, in star-configuration, without position sensors for the permanent magnet rotor, using a phase translator logic circuit controlled by commutation pulses to control, through a plurality of output signals, a corresponding number of power switches for commutating the excitation of a phase windings of the motor, comprising:

a number, equivalent to the number of phase windings of the motor, of differential input stages capable of providing an output voltage signal which represents the potential difference between one end of a respective phase winding and the star-center;

an equal number of comparators, each having an input to which is applied the signal produced by a respective differential input stage and which output first logic signals which are representative of a crossing having taken place of a reference level by the respective signal produced by said differential input states;

an equal number of logic circuits, each capable of generating output pulses of a duration equal to the period of the signal of a system clock, having a selected frequency, with each commutation edge, rising and falling, of a respective first logic signal applied to the respective input, such first logic signal representative of the crossing having taken place of the reference level by the respective signal;

a selection circuit having a plurality of inputs and at least one output, to first inputs of which are applied said pulses generated by the respective logic circuits, to second inputs of which are applied said output signals of said phase translator logic circuit, and to one input of which is applied a masking signal, and which is capable of selecting between said first inputs an input relating to a non-excited phase winding as a function of the configuration of said second inputs and depending upon the logic state of said masking signal, and of generating through said output a commutation pulse for said phase translator logic circuit at the moment in which the signal related to the selected phase winding crosses the reference level; and logic means controlled by said commutation pulse for producing, in response to each pulse received, said masking signal which is applied to the relevant input of said selection circuit, wherein the masking signal has a duration equal to a preset fraction of a period of time intervening between two successive commutations of the excitation of the phase windings of the motor preceding the commutation pulse received;

when said logic means is formed essentially by three counters, a first counter being used as multiplier of the frequency of the system clock in order to generate two separate clock signals which are used respectively by the other two counters, the second counter counting from zero to n, where n is set as a function of the limits of the frequency of commutation and of the clock used, and counting in terms of k clock periods the time intervening between two successive commutations of the excitation of the phase windings of the motor, and the third counter, provided with presettable inputs, counting from a preset value to zero, and being enabled to count from k clock periods and producing in output a logic masking signal until it arrives at zero.

2. A method for driving in a commutated mode a multiphase brushless DC motor having a permanent-magnet rotor and a stator with at least two primary windings forming a multiphase system, without the aid of position sensors of the permanent-magnet rotor, comprising the steps of:

a) separately sensing a voltage signal on each phase winding of the stator, which signals, when the motor is driven into rotation, have a substantially sinusoidal affected by transient spikes following each commutation of the excitation of said phase windings;

b) separately detecting the crossing of said spike affected, sinusoidal signals of a predetermined reference voltage level which is intermediate with respect to the peak-to-peak levels of said substantially sinusoidal signals;

c) generating respective logic commutation signals when any of said sinusoidal signals crosses said reference voltage level; and d) selecting a logic commutation signal relative to the sinusoidal signal sensed on a non-excited phase winding of said multiphase stator for commutating the excitation of said phase windings while preventing the selection of any one of said logic commutation signals for a masking period of time, subsequent to each commutation of the excitation of said phase windings of the stator, having a duration which is a predetermined fraction of the period of time elapsed between two preceding commutations of the excitation of said phase windings.

3. A method as defined in claim 2, wherein said predetermined fraction of time is sufficiently long to allow the decay of transient spikes present on said sinusoidal signals as caused by a commutation of the excitation of said phase windings.

4. A control circuit for driving in a commutated manner a multiphase brushless DC motor having a permanent-magnet rotor and a stator with at least two primary windings forming a multiphase system, the control circuit comprising:

electronic switching elements for selectively commutating excitation of said stator windings, and driven by a phase translator logic interface circuit controlled by logic commutation pulses;

means for separately sensing a voltage signal on each phase winding of the stator, which signals, when the motor is switchingly driven to rotation, have a substantially sinusoidal affected by transient spikes following each commutation of the excitation of said phase windings;

means for separately detecting the crossing of said spike affected, sinusoidal signals of a predetermined reference voltage level which is intermediate with respect to the peak-to-peak levels of said substantially sinusoidal signals;

means for generating respective logic commutation signals when said sinusoidal signals cross said reference voltage level;

means for selecting, among said respective logic commutation signals, the signal relative to the sinusoidal voltage signal sensed on a non-excited phase winding of said multiphase stator, said selected commutation signal being applied to a control terminal of said phase translator logic interface circuit;

means for preventing the selection of any of said respective logic commutation signals for a masking period of time subsequent to a commutation of the excitation of said phase windings of the stator, said masking period having a duration which is a predetermined fraction of the period of time elapsed between two preceding commutations of the excitation of said phase windings.

5. A control circuit as defined in claim 4, wherein said predetermined fraction of time is sufficiently long to allow the decay of transient spikes present on said sinusoidal signals and caused by a commutation of the excitation of said phase windings.

6. A control circuit as defined in claim 4, wherein the means for generating respective logic commutation signals includes first and second D-type flip-flops functionally connected in cascade and an exclusive OR gate, wherein an input terminal of the first flip-flop is connected to a signal generated by one of said separately detecting means, an output terminal of said first flip-flop is connected to an input terminal of the second flip-flop and to a first input of said exclusive OR gate, an output terminal of said second flip-flop is connected to a second input of said exclusive OR gate, and a system clock signal is applied to a clock terminal of both flip-flops;

whereby said exclusive OR gate produces on an output terminal thereof a pulse of predetermined duration when the respective sinusoidal signal crosses said reference voltage level.

7. A control circuit as defined in claim 4, wherein said means for selecting comprises a selection circuit having a plurality of inputs and at least one output, to first inputs of which are applied said respective logic commutation signals, to second inputs of which are applied replicas of logic signals generated by said phase translator logic interface circuit for driving said electronic switching elements, and to one input of which is applied a masking signal;

said selection circuit being capable of selecting among said first inputs the input relative to a non-excited phase winding of the stator depending on the configuration of said second inputs and depending upon the logic state of said masking signal;

the selection circuit generating through said output a commutation pulse for said phase translator logic interface circuit at the instant when the sinusoidal signal relative to the selected non-excited phase winding crosses said reference level.

8. A control circuit as defined in claim 7, wherein said means for preventing the selection comprises an inhibit circuit having an input and an output, said commutation pulse generated by said selection circuit being applied to the input, wherein said inhibit circuit is capable of generating on said output, in response to each pulse received, said masking signal which has a duration equal to a predetermined fraction of the period of time elapsed between two successive commutations of the excitation of the phase winding of the stator which have preceded said commutation pulse applied to the input of the circuit.

9. A control circuit as defined in claim 8, wherein said inhibit circuit comprises three counters, a first counter being used as a multiplier of a frequency of a system clock in order to generate two separate clock signals which are used respectively by the other two counters, the second counter counting from zero to n, where n is set as a function of the limits of the frequency of commutation and of the clock used, and counting in terms of k clock periods the time intervening between two successive commutations of the excitation of the phase windings of the motor, the third counter, provided with presettable inputs, counting from a preset value to zero, and being enabled to count from k clock periods and producing on an output terminal said logic masking signal until it arrives at zero.

* * * * *